United States Patent Office 3,830,734
Patented Aug. 20, 1974

3,830,734
CAPSULE COLUMNS FOR LIQUID-LIQUID EXTRACTION
Michael G. Wingard, Xenia, Dennis W. Werkmeister, New Lebanon, Curt Thies, Dayton, and William B. Anthony, Middleburg Heights, Ohio, assignors to The National Cash Register Company, Dayton, Ohio
No Drawing. Filed Nov. 10, 1972, Ser. No. 305,516
Int. Cl. B01d 13/00
U.S. Cl. 210—22                                             7 Claims

ABSTRACT OF THE DISCLOSURE

A rechargeable column is disclosed for use in extraction or other separation processes wherein the column packing is a liquid material contained, in minute droplets, within the confines of, liquid permeable, polymeric membranes or matrix structures. The column operates solely on a mass action theory of solution equilibria wherein the column liquid is immiscible with the liquid to be treated and is miscible with the material to be separated. The material to be separated is drawn across the polymeric membranes from solution in the liquid to be treated to solution in the column liquid; and, as a result, the material to be separated is taken up in the column liquid.

BACKGROUND OF THE INVENTION

Field of the Invention

The present invention pertains to a process for performing liquid-liquid extraction and liquid component separations. The process always relies on a liquid-liquid contact and interaction between an extracting liquid and a liquid to be treated.

The invention pertains to liquid-liquid extraction across a membrane wherein the liquid to be treated is maintained on one side of the membrane; the extracting liquid, selected to be immiscible with the liquid to be treated, is maintained on the other side of the membrane; and the material to be extracted, miscible with both liquids, can freely cross the membrane in either direction.

Additionally, the invention pertains to extraction and to a column or conduit for conducting the extraction and wherein the column is packed with a solid which includes and contains an extracting liquid. The extracting liquid is enclosed, in minute droplets, within the confines of solid, but liquid-permeable, polymeric membrane or matrix structures.

The invention pertains to extraction and to extraction columns or conduits wherein liquid extracting media are maintained immobilized in the columns and available to extractive contact in large surface areas by being present in minute droplets and by being enclosed in permeable plymeric membrane materials.

The present invention further and particularly relates to such extractive columns and to the process for using them wherein the liquid of the column packing is indefinitely rechargeable for repeated use in liquid-liquid extraction processes.

Description of the Prior Art

Thomas M. S. Chang et al., in the Canadian Journal of Physiology and Pharmacology, Volume 45, 705–715 (1967), discloses treatment of blood by the use of microcapsules which contain aqueous solutions of enzymes. The membranes which form the microcapsule wall are said to be semi-permeable in that the enzyme materials contained in the capsules cannot escape through the membrane pores. Toxic components of the blood to be treated enter through pores in the walls of microcapsules packed in a column. Once in the capsules, there is a reaction to convert the toxic components into non-toxic materials which leave the capsules and are swept away in the blood flow through the column. The capsules of the subject disclosure experience no liquid-liquid extraction and, in fact, the capsule wall pores are intentionally made to be too small to pass the active encapsulated components. Moreover, the encapsulated enzyme material, once contaminated or otherwise depleted cannot be replaced to recharge the capsule activity. The liquid-containing capsules are not rechargeable. U.S. Pat. No. 3,522,346, issued July 28, 1970 on the application of T. M. S. Chang, further discusses such enzyme-containing capsules and their use.

Liquid-liquid extraction processes are well-described in the prior art. For example, The Chemical Engineers' Handbook, edited by John H. Perry and published by McGraw-Hill (1950) contains an entire section devoted to extraction processes amongst which are included liquid-liquid processes, both concurrent and countercurrent. To our knowledge, the prior art does not contain reference to liquid-liquid extraction processes wherein the extracting liquid is a discontinuous phase immobilized with respect to the liquid to be treated. Additionally, and more specifically, we are not aware of prior art disclosing rechargeable column or conduit devices for conducting such processes.

SUMMARY OF INVENTION

The present invention relates to certain processes and devices for performing liquid-liquid extraction between an extracting liquid and a liquid to be treated and it is an object of this invention to provide such liquid-liquid extraction wherein the extracting liquid is immobilized with respect to the liquid to be treated.

It is, additionally, an object of the invention to provide the immobilized extracting liquid in finely-divided, discontinuous, form, thus exhibiting a relatively high surface area for contact between the extracting liquid and the liquid to be treated. The present invention provides that immobilization of the extracting liquid is achieved by its being contained by or within a membrane or matrix which, under proper conditions, is permeable to the extracting liquid, the liquid to be treated and the material to be extracted.

The present invention provides, as an object, a process for an extraction column using the immobilized extracting liquid wherein the column is indefinitely rechargeable for repeated operation. The preferred form for the immobilized extracting liquid is as microcapsules wherein the membrane is capsule walls of solidified polymeric material, permeable, in proper conditions, to transport of certain liquids.

By the word, permeable, it is not meant that materials contained within capsule walls will easily leak out on exposure to a gaseous atmosphere. Permeable, in the sense of this invention, pertains to the freedom of liquid materials to easily transfer across a membrane capsule wall when the liquids are opposing, that is, one on each side of the membrane. The inventors have discovered that a material which is miscible with each of the two opposing, mutually immiscible, liquids can readily move across the interface of the opposing liquids even if the interface exists at or in a permeable membrane. Movement across the interface is facilitated by a concentration gradient with respect to the material moving to provide a mass action driving force.

Liquid-liquid batch extraction processes utilize an extracting liquid and a liquid to be treated, from which some dissolved material is to be extracted. The extracting liquid is selected to be substantially immiscible with the liquid to be treated and to be miscible with the material to be extracted. An amount of the extracting liquid and an amount of the liquid to be treated are agitated together and, to the extent that the material to be extracted is attracted to and dissolved by the extracting liquid, it is separated from the liquid to be treated. The two liquids are then isolated—the extracting liquid for discard or reclaim, and the treated liquid for whatever its intended use. Although batch processes are inefficient and cumbersome, the approprite concepts are utilized and conveyed for understanding of general extraction processes. The extracting liquid is generally present as a discontinuous phase of finely-divided liquid parcels or droplets dispersed in a continuous phase of the liquid to be treated. Whether or not the parcels of extracting liquid are combined and reformed during the course of the process, material to be extracted migrates across the interface of immiscibility between extracting liquid and liquid to be treated until the concentration of that material in each phase is such that there is no tendency for further migration.

Continuous extraction processes include concurrent flow extraction which is similar to batch extraction wherein the opposing liquids simply move together in the same direction in an extraction conduit. Also included in continuous extraction processes is countercurrent flow extraction wherein the opposing liquids are introduced at remote points of an extraction conduit and are caused to combine and flow past one another in opposite directions. The principle of migration across the interface of immiscibility remains the same for countercurrent extraction as it is in concurrent extraction, but application of the principle is somewhat different. Viewed from the introduction of extraction liquid (and exit of treated liquid): being fresh liquid, not yet used, the extracting liquid is completely free of material to be extracted and; having previously been the entire course of the conduit, the liquid to be treated is very low in concentration of material to be extracted. The extracting liquid is free of material to be extracted and, thus, exhibits its greatest tendency to dissolve the material. Despite the fact that the liquid to be treated contains the material at a low concentration, the fresh, unused, extracting liquid may be able to attract and dissolve some more of the material. Viewed from the introduction of the liquid to be treated (exit of the extracting liquid): being completely untreated, the liquid to be treated is at its maximum concentration of material to be extracted and; having previously been the entire course of the conduit, the extracting liquid has a concentration of material to be extracted approaching, but less than, that of the liquid to be treated, in terms of solubility driving force. Although the opposing liquids contain high concentrations of the material, some extraction can still occur by virtue of the concentration gradient and its consequent migration driving force tending to cause the material to be extracted from the liquid to be treated and passed to the extracting liquid.

In the present invention, the extracting liquid remains stationary in the conduit while the liquid to be treated flows through the conduit. Liquid to be treated, as it enters the conduit, encounters extracting liquid immobilized by permeable membranes of polymeric material. The membranes of polymeric material are permeable to transport of the material to be extracted by virtue of the solubility of that material to be extracted in both the extracting liquid and the liquid to be treated. The mutual immiscibility between the extracting liquid and the liquid to be treated prohibits release of the extracting liquid from immobilization by the permeable membrane and transfer of either liquid across the membrane. The liquid to be treated contacts a large surface area of immobilized extracting liquids as it advances through the conduit and, until the extracting liquid throughout the conduit is saturated by extracted material, there will be continued extraction and exeunt of completely treated liquid.

The extracting liquid, when saturated, is rejuvenated by contact with extracting liquid which has no extracted material dissolved therein (herein termed recharging liquid). Such a contact establishes a driving force, for the extracted material, directed from the extracting liquid toward the recharging liquid and operates to remove substantially all of the extracted material from the conduit by flow, therethrough, of the recharging liquid. In this manner, the conduit and its extracting liquid contents can be used and recharged repeatedly without need to replace the extracting liquid. The recharging liquid can, of course, be a liquid other than extracting liquid; the only requirement being that the recharging liquid must be a good solvent for the material to be extracted. If the recharging liquid is not the same as the extracting liquid and if it is desired or required that the rejuvenated extracting liquid be substantially uncontaminated by recharging liquid, then the recharging liquid must be substantially immiscible with the extracting liquid.

The preferred form for the permeable immobilizing polymeric materials is as the walls of minute, substantially spherical, capsules. The capsules are placed in a column or conduit and are used much like the solid resin beadlets in an ion exchange column. The capsules exhibit high surface area exposure across which the extraction takes place. The capsules are termed "minute" with regard to size and capsule diameters may range from a few microns to several thousand microns. Preferred capsule sizes are about 5 to about 2000 microns in average diameter with the most preferred sizes in the 25 to 1000 micron range. It is understood that the capsule surface area increases as the square of an increase in the diameter and that, for a given system, extraction increases proportionally with increase in surface area. To some extent, then, the extraction of this invention can be controlled by selection of capsule diameter.

Another parameter affecting extraction through the capsule walls is the kind and type of polymeric material used in the membrane manufacture. Almost all polymeric materials are permeable to some extent and the requirement of the present invention is to accomplish extraction across a membrane of polymeric material in accordance with a particular process. To the extent that a polymeric membrane exhibits extraction by permeation, that membrane is eligible for use in the present invention. Polymeric materials preferred for use in this invention include: polyvinylformal; polyvinylbutyral; polyvinylacetate; ethyl cellulose; poly(vinylchloride-co-vinylacetate), partially hydrolyzed or not; poly(vinylidenechloride)-co-vinylchloride); poly(vinylidenechloride - co - acrylonitrile); chlorinated rubber and combinations of those aforenamed, and the like.

As a general rule, the thickness of the membrane is not important except, in the case of capsules, as it reduces the amount of extracting material contained in the capsules. When capsules are used, the capsules preferably contain from about 50 to about 98 percent, by weight, extracting material; the remainder constituting polymeric capsule wall material.

As to the material to be used for extracting liquids, it is required that it be a good solvent for the material to be extracted. Preferably, the extraction liquid is more effective than the liquid to be treated, as a solvent for the material to be extracted. Also, preferably, the extraction liquid is not miscible with the liquid to be treated. While the process is operable using extracting liquids which are somewhat miscible with the liquid to be treated, miscibility between the liquids will result in contamination of the liquid to be treated by the extracting liquid due to liquid-liquid exchange through the membrane. The presently most common practice of this process utilizes a conduit packed with capsules wherein the capsules contain an aqueous extracting liquid and wherein the liquid to be treated is nonaqueous and either insoluble or only slightly soluble in the extracting liquid. The material to be extracted is initially dissolved in the liquid to be treated but is more and preferentially soluble in the extracting liquid.

The preferred continuous process, generally, includes the following steps:

(a) introducing liquid to be treated into a conduit having an entrance and an exit and containing a multitude of individual solid particles of permeable, polymeric membrane material surrounding droplets of an extracting liquid:
(b) conducting the liquid to be treated through the conduit in intimate contact with the solid particles;
(c) removing the liquid to be treated from the conduit.

The above steps result in removal of a material to be extracted from the liquid to be treated and absorption of that material into the extracting liquid. The three steps can be continuously performed until the extracting liquid is substantially saturated. On saturation, the extracting liquid can be rejuvenated by repeating steps (a) through (c) and substituting recharging liquid for the liquid to be treated. Rejuvenation is considered completed when the recharging liquid removed from the conduit is substantially free of material to be extracted or, equivalently, is low enough in concentration of material to be extracted to serve again as an extracting liquid.

DESCRIPTION OF THE PREFERRED EMBODIMENTS

Example A.—Preparation of Capsules as Solid Particles Which Include Extracting Liquid Capsules containing an aqueous liquid are eligible for use herein. As an example, capsules are prepared in accordance with U.S. Pat. 3,674,704, issued July 4, 1972. The permeable polymeric membrane for use as the capsule wall material herein is partially hydrolyzed poly-(ethylene-co-vinylacetate) (such as that obtained from E. I. du Pont de Nemours & Co., Inc., Wilmington, Del., under the trademark designation "Elvon PB–7802" hydroxy-vinyl resin). The polymeric material is specified to be about 50–53 percent hydrolyzed and 10 grams of the material is dissolved in 500 milliliters of toluene at above about 60° C. One hundred milliliters of water is added as a capsule internal phase and agitation is initiated to obtain a dispersion of the water. Twenty-five milliliters of cotton-seed oil is added as a phase-separation inducer and agitation is continued to maintain the dispersion. The dispersed system is then chilled to about 25° C. and 200 milliliters of a solution of 5 percent, by weight, "Mondur CG–75" (trademark) in toluene is added to crosslink and chemically harden the capsule wall material. "Mondur CB–75" is a toluene diisocyanate adduct of trimethanol propane as obtained from the Mobay Chemical Company, Pittsburgh, Pa. Agitation is continued for a few hours at room temperature and then for about 10 hours at about 45° C. Agitation is then stopped, the supernatant liquid vehicle is removed, the capsules are washed with hexane and then with water and then are dried. These capsules are approximately 600 microns in diameter and are used as examples of conduit packing material. Variations on the encapsulating process and on the materials used are published and are apparent to those skilled in the art. For example, an extracting liquid of 80/20, by weight glycerol/water is also effective.

Example 1

A glass column with an internal diameter of about two centimeters is packed with about 16 grams of the capsules from Example A or capsules equivalent thereto. The capsules should contain about 85 perecnt, by weight, aqueous extraction liquid. The liquid to be treated is one liter of chloroform containing one percent, by weight, monoethanolamine (MEA). The MEA is the material to be extracted. The liquid to be treated is conducted through the column and an analysis of that liquid, as it is removed from the column, reveals that slightly more than 13 grams of MEA is absorbed by the capsules. The chloroform initially contained 14.9 grams of MEA. Thus, about 13 grams of aqueous extraction liquid in the capsule column absorbed 13 grams of the MEA from 1490 grams (1 liter) of chloroform leaving only 1.9 grams of the MEA as a residual contaminant. Eighty-seven (87) percent, by weight, of the MEA is extracted.

Example 2

The column of Example 1 is packed with 16 grams of capsules similar to those of Example A. The liquid to be treated is 500 milliliters of chloroform having two percent, by weight, triethanolamine (TEA) dissolved therein. TEA is the material to be extracted. An analysis of the chloroform, as it flows from the column, reveals that 13.2 grams of TEA is extracted out of the 14.9 grams initially present. Eighty-nine (89) percent, by weight, of the TEA is extracted.

Example 3

Two hundred (200) milliliters of water is flowed through the capsule packing of Example 2 which includes the 13.2 grams of TEA after extraction. The water, as recharging liquid, is analyzed and found to contain 10.0 grams of TEA, thus establishing that recharging liquid in an amount of only one-fifth of the amount of the liquid to be treated is required to remove more than 75 percent, by weight, of the material to be extracted. Removal of about 75 percent of the material to be extracted is taken to be removal of substantially all of that material because the column can then be reused for liquid-liquid extraction.

Example B.—Comparison With Batch Liquid-Liquid Extraction

As a comparison with extraction results using the present process, 500 milliliters of chloroform, 10 grams of monoethanolamine (MEA) and 13 grams of water are thoroughly shaken together and then permitted to separate into two phases. Analysis of the phases reveals that 2.5 grams of MEA remains in the chloroform phase and that only 75 percent, by weight, of the MEA is extracted.

Example 4

The column of Example 1 is charged with about 16 grams of capsules from Example A; and 500 milliliters of chloroform having two percent, by weight, monoethanolamine (MEA) is flowed through the column. The chloroform removed from the column is analyzed for MEA content and then the column is rejuvenated with 200 milliliters of water and the water is analyzed to determine the amount of MEA removed by the recharging water. This cycle is completed six times, each cycle using new solutions of MEA in chloroform as liquid to be treated and water as recharging liquid, and the results are tabulated below.

| Cycle number | MEA extracted | | MEA removed from column | |
|---|---|---|---|---|
| | Grams | Percent | Grams | Percent |
| 1 | 14.9 | 100 | 9.4 | 64.0 |
| 2 | 14.6 | 98.2 | 9.7 | 65.0 |
| 3 | 14.7 | 98.8 | 12.1 | 70.5 |
| 4 | 14.2 | 95.3 | 12.1 | 73.5 |
| 5 | 14.6 | 98.2 | 11.6 | 74.6 |
| 6 | 14.4 | 96.8 | 11.2 | 74.8 |

It should be understood that among the eligible materials to be extracted are included any composition which is easily water soluble; and that among the eligible permeable polymeric membranes are included any polymeric material which is not dissolved by either the extracting liquid or the liquid to be treated. The membrane materials function not so much as a feature of their ability for other materials to permeate the membranes, but as a feature of their thinness; membranes thin enough being permeable to some extent no matter what the physical characteristics of the material. For that reason, there are alternative means of producing the immobilized extracting liquid. Cast and dried emulsions or dispersions of extracting liquid in appropriate polymeric material can be pulverized to yield chips and minute pieces of polymer containing the liquid. Extraction columns or conduits can be packed with these chips and pieces for practicing the invention. Moreover, minute molds can be used to cast solid but extracting-liquid-containing pellets or pieces for preparation of extraction conduits. Of course, any appropriate encapsulating process can be used to prepare capsules for use in the extraction conduits.

What is claimed is:

1. A process for continuously conducting a liquid-liquid extraction in a conduit having an entrance and an exit and containing a multitude of individual microcapsules of a size from about 5 to 2000 microns and having walls of permeable polymeric membrane material containing an aqueous extracting liquid in an amount equal to about 50 to about 98 percent of the total microcapsule weight including the steps of:
    (a) continuously introducing a flow of liquid to be treated, substantially immiscible with the extracting liquid, into the entrance of the conduit;
    (b) continuously conducting the liquid to be treated through the conduit from the entrance to the exit and in intimate contact with the microcapsules;
    (c) continuously removing the liquid to be treated from the conduit;
    (d) maintaining steps (a) through (c) until the extracting liquid is saturated by material to be extracted as evidenced by an increasing concentration of material to be extracted in the liquid to be treated continuously removed in step (c);
    (e) replacing the continuous introduction of liquid to be treated by a continuous introduction of recharging liquid;
    (f) continuously conducting the recharging liquid through the conduit;
    (g) continuously removing the recharging liquid from the conduit;
    (h) maintaining steps (e) through (g) until the extracting liquid is substantially free of material to be extracted as evidenced by a substantial absence of material to be extracted in the recharging liquid continuously removed in step (g).

2. The process of claim 1 wherein the recharging liquid is the same material as the extracting liquid.

3. The process of claim 1 wherein the recharging liquid is different from and substantially immiscible with the extracting liquid.

4. A process for continuously conducting a liquid-liquid extraction of a material to be extracted from solution in a liquid to be treated by means of an aqueous extracting liquid contained in individual microcapsules in an amount equal to about 50 to about 98 percent of the total microcapsule weight, the microcapsules having an average size from about 5 to 2000 microns and having walls of permeable polymeric membrane material wherein the material to be extracted is soluble in the extracting liquid and in the liquid to be treated, including the steps of: (a) introducing the liquid to be treated, substantially immiscible with the extracting liquid, into the entrance end of a conduit having an entrance end and an exit end and containing a multitude of the microcapsules to contact the liquid to be treated (b) conducting the liquid to be treated through the conduit to cause extraction of the material to be extracted into the extracting liquid from the liquid to be treated by reason of the tendency for the material to be extracted to permeate the membrane material and preferentially dissolve in the extracting liquid; and (c) removing the liquid to be treated from the conduit leaving behind in the conduit substantially all of the material to be extracted.

5. A process for continuously conducting a liquid-liquid extraction to rejuvenate an aqueous extracting liquid contained in individual microcapsules in an amount equal to about 50 to about 98 percent of the total microcapsule weight, the microcapsules having an average size from about 5 to 2000 microns and having walls of permeable polymeric membrane material by removing a material to be extracted from the extracting liquid using a recharging liquid which dissolves the material to be extracted including the following steps: (a) introducing the recharging liquid into the entrance end of a conduit having an entrance end and an exit end and containing a multitude of the microcapsules to contact the recharging liquid; (b) conducting the recharging liquid through the conduit to cause extraction of the material to be extracted into the recharging liquid from the extracting liquid by reason of the tendency for the material to be extracted to permeate the membrane material and preferentially dissolve in the recharging liquid; (c) removing the recharging liquid from the conduit and, at the same time, removing substantially all of the material to be extracted.

6. The process of claim 5 wherein the recharging liquid is the same material as the extracting liquid.

7. The process of claim 5 wherein the recharging liquid is different from and substantially immiscible with the extracting liquid.

References Cited

UNITED STATES PATENTS

| 3,598,728 | 8/1971 | Bixler et al. | 210—22 |
| 3,522,346 | 7/1970 | Chang | 424—35 |
| 3,574,704 | 4/1971 | Claassen et al. | 260—471 |

OTHER REFERENCES

Perry's Chemical Engineers Handbook, Perry et al., 4th ed., pp. 19–19, 19–20.

CHARLES N. HART, Primary Examiner

F. H. LANDER, Assistant Examiner

U.S. Cl. X.R.

210—321